United States Patent
Goodrich, II et al.

(10) Patent No.: US 6,850,535 B1
(45) Date of Patent: Feb. 1, 2005

(54) BACKPLANE UTOPIA BUS

(75) Inventors: Earl Goodrich, II, Lansing, MI (US); Christopher M. Tumas, Brooklyn, MI (US)

(73) Assignee: Sprint Communications Company L.P., Overland Park, KS (US)

(*) Notice: Subject to any disclaimer, the term of this patent is extended or adjusted under 35 U.S.C. 154(b) by 733 days.

(21) Appl. No.: 09/711,113

(22) Filed: Nov. 9, 2000

(51) Int. Cl.$^7$ ............................................. H04L 12/28
(52) U.S. Cl. ................................... 370/419; 370/401
(58) Field of Search ................................. 370/230, 232, 370/235, 419, 398.6, 423, 424, 463, 465, 421, 474, 396, 395.72

(56) References Cited

U.S. PATENT DOCUMENTS

| | | | |
|---|---|---|---|
| 5,881,142 A | 3/1999 | Frankel et al. | 379/167 |
| 5,963,620 A | 10/1999 | Frankel et al. | 379/93.05 |
| 6,075,784 A | 6/2000 | Frankel et al. | 370/356 |
| 6,141,339 A | 10/2000 | Kaplan et al. | 370/352 |

OTHER PUBLICATIONS

U.S. Appl. No. 09/197,044, Way et al., filed Nov. 20, 1998.
U.S. Appl. No. 09/226,575, Rush et al., filed Jan. 7, 1999.
U.S. Appl. No. 09/650,985, Kaplan et al., filed Aug. 30, 2000.
U.S. Appl. No. 09/650,560, Kaplan et al., filed Aug. 30, 2000.
U.S. Appl. No. 09/653,105, Dale et al., filed Aug. 31, 2000.
U.S. Appl. No. 09/675,585, Goodrich, filed Sep. 29, 2000.
U.S. Appl. No. 09/687,683, Bayerl et al., filed Oct. 12, 2000.
U.S. Appl. No. 09/689,365, Goodrich, filed Oct. 12, 2000.
U.S. Appl. No. 09/702,933, Mahaney, filed Oct. 31, 2000.

*Primary Examiner*—Kenneth Vanderpuye
*Assistant Examiner*—Ricardo Pizarro

(57) ABSTRACT

The present invention discloses a system for buffering the outputs of peripheral devices operating in UTOPIA protocol to allow devices on separate circuit boards connected through long buses, such as backplanes, to communicate with the system controller. Address detection logic stores the peripheral device address and compares it to the UTOPIA bus address signal. When the correct address is recognized in a first clock cycle, a flip flop stores the information for the next cycle. A second flip flop stores the state of the read enable signal. An AND gate detects when the correct address was found and the read enable was de-asserted during the first clock cycle and the read enable and read cell available signals are positive during the current clock cycle and provides a high signal to a third flip flop. On a third clock cycle the third flip flop enables the outputs of a data buffer which then drives the peripheral device data signals on to the read data bus. The third flip flop output and the read enable signal are provided to a second AND gate which feeds back to the third flip flop to maintain its state until the read enable signal is de-asserted. The first flip flop is also used to control a buffer for the read cell available signal from the peripheral device. The third flip flop is also used to control a buffer for the read start of cell signal from the peripheral device.

7 Claims, 2 Drawing Sheets

BACKPLANE UTOPIA BUS

FIELD OF THE INVENTION

The present invention relates to use of Universal Test and Operations PHY Interface for ATM (UTOPIA) Level 2 protocol in a telecommunications hub having a backplane and more particularly to a system for controlling data flow between a peripheral device and an ATM controller through the backplane.

BACKGROUND OF THE INVENTION

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and a least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, TI, or HDSL-2. Examples of user interfaces include telephone interfaces such as plain old telephone system (POTS) ports for connecting telephones, fax machines, modems, and the like to the ISH; computer interfaces such as B ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc. connected to a telephone line is attempting to access and use the line.

The ISH includes a processing core or central processing unit, CPU, which controls these functions. It must exchange data with numerous peripheral devices within and external to the ISH itself. It is desirable to use the Universal Test and Operations PHY Interface for ATM level 2 ("UTOPIA 2") protocol for some of these data exchanges. This protocol was developed by the ATM Forum and is an accepted industry standard. In one aspect of this protocol, data is transferred from multiple peripheral devices (called PHYs, an acronym for physical layer interfaces) to the ATM layer device, such as the central processor, on a read bus and from the ATM layer to the PHYs on a separate write bus. Address and control buses are also provided for controlling the data transfers between the ATM layer and the various PHY devices. The ATM layer interface controls data transfer by generating commands or signals indicating when it is ready to read or write data.

There are two particular functional aspects of this polled multi-PHY mode of UTOPIA 2 that are relevant here. In the first aspect, the ATM layer 'polls' the available PHY devices using the address bus and the Cell Available indication (CLAV) status line to discover which PHY devices are ready to transfer a cell. The second aspect is when, using accumulated knowledge of which PHYs need service, the ATM layer will, in a later cycle, use the same address lines in conjunction with other control lines to select a single PHY to initiate a cell transfer. For example, when the ATM layer needs to read data from a peripheral, it drives the read address bus with the address of the selected peripheral and places a read enable command on the control bus. In response to these commands, the addressed device writes, or drives, a byte on the read data bus during each of a series of clock cycles. On the positive going transitions of each clock cycle the CPU reads and stores the byte which was supplied by the peripheral during that clock cycle.

The UTOPIA 2 protocol defines all this ATM layer/PHY interaction, but it was prepared with the assumption that the controller and all peripheral devices would physically reside on the same printed circuit board. The read and write buses would therefore be short and the controller and peripherals would have sufficient drive capacity on their data outputs to directly drive the buses. Generally the controller and the peripherals are in the form of integrated circuit chips mounted on a printed circuit board. The protocol did not anticipate the complex systems like modern telecommunications hubs which have the ATM controller mounted on one circuit board and peripheral devices carried on separate printed circuit boards. The multiple boards are interconnected by being plugged into a backplane to receive operating power, address and control signals, and for connection to the read and write buses. Peripheral devices do not generally have sufficient power to drive the signals onto and across the backplane buses which are physically much longer than those anticipated by the chip designers. In addition, the backplane operating environment may not be appropriate for the integrated circuit interfaces, such as for hot-swap.

While it is known to use buffers to increase the drive capacity of a signal, the UTOPIA protocol does not anticipate such use. The peripheral chip designers also did not anticipate such use. The peripheral devices receive the control signals from the controller and decode these internally to know when to send or receive status and/or data signals. When the outputs of a peripheral are not sending data, they go to a three state or high impedance output condition. This allows other peripherals connected to the signal wires to drive signals on the bus. However, the peripheral devices do not provide any output signal indicating when it is driving data and when it is in three state condition. If buffer inputs were connected to such data outputs, the buffer would go into an unknown state and possibly oscillate when the peripheral outputs go high impedance. Its outputs would continue driving the backplane, which is not acceptable. It is desirable to provide a system which allows the outputs of a peripheral device to be buffered to drive data across a backplane bus without these problems.

SUMMARY OF THE INVENTION

The present invention discloses a system for providing buffered outputs for peripheral devices in a UTOPIA 2 based system which causes the buffer outputs to go to high impedance state when the peripheral device is not to send signals to the buffered bus (backplane). The system includes a data buffer having inputs connected to the peripheral device data outputs and having outputs connected to the read bus and other buffers for the control signals back to the ATM layer device. These buffers have control inputs which allow them to be either in an active state or in an inactive state in which its outputs go to high impedance. The system also includes address detection logic which is set by the central system controller to store the address(es) of any peripheral device(s) for which this logic is controlling the buffers, and is connected to the address bus and provides a signal when the bus address is the same as one (or more) of the stored address(es). A first flip flop stores the status of the address signal from the preceding clock cycle. This indication is used directly to control the buffer for the cell-available signal, as this is exactly the condition necessary for the 'polling' cycle of UTOPIA 2, and is also necessary for the first clock of a PHY select operation for a cell transfer. A second flip flop stores the status of the receive enable signal from the preceding clock cycle. An AND gate has inputs connected to the two flip flops, to the receive enable signal, and to the read cell available output of the peripheral and has its input connected through an OR gate and a third flip flop to the output enable input of the buffer. A second AND gate has inputs connected to the read enable signal and to an output of the third flip flop and an output connected to an input of the OR gate. The logic circuitry causes the data buffer and a start of cell signal buffer to go active only during clock cycles when the peripheral needs to drive data onto the read data bus.

DEFINITIONS OF TERMS

Terms and acronyms used in the UTOPIA 2 protocol and otherwise used in this disclosure have the following meanings.

RXCLK is an acronym meaning the receive or read bus clock signal which is provided on a control bus. There may also be a separate TXCLK, transmit clock signal for the transmit direction.

RXEN is an acronym meaning the receive or read enable signal, which indicates that the processor is ready to receive data from the addressed peripheral. It is an instruction to the peripheral to write or drive a data byte onto the read data bus. The ATM layer device provides this signal on the control bus.

Figure 1:
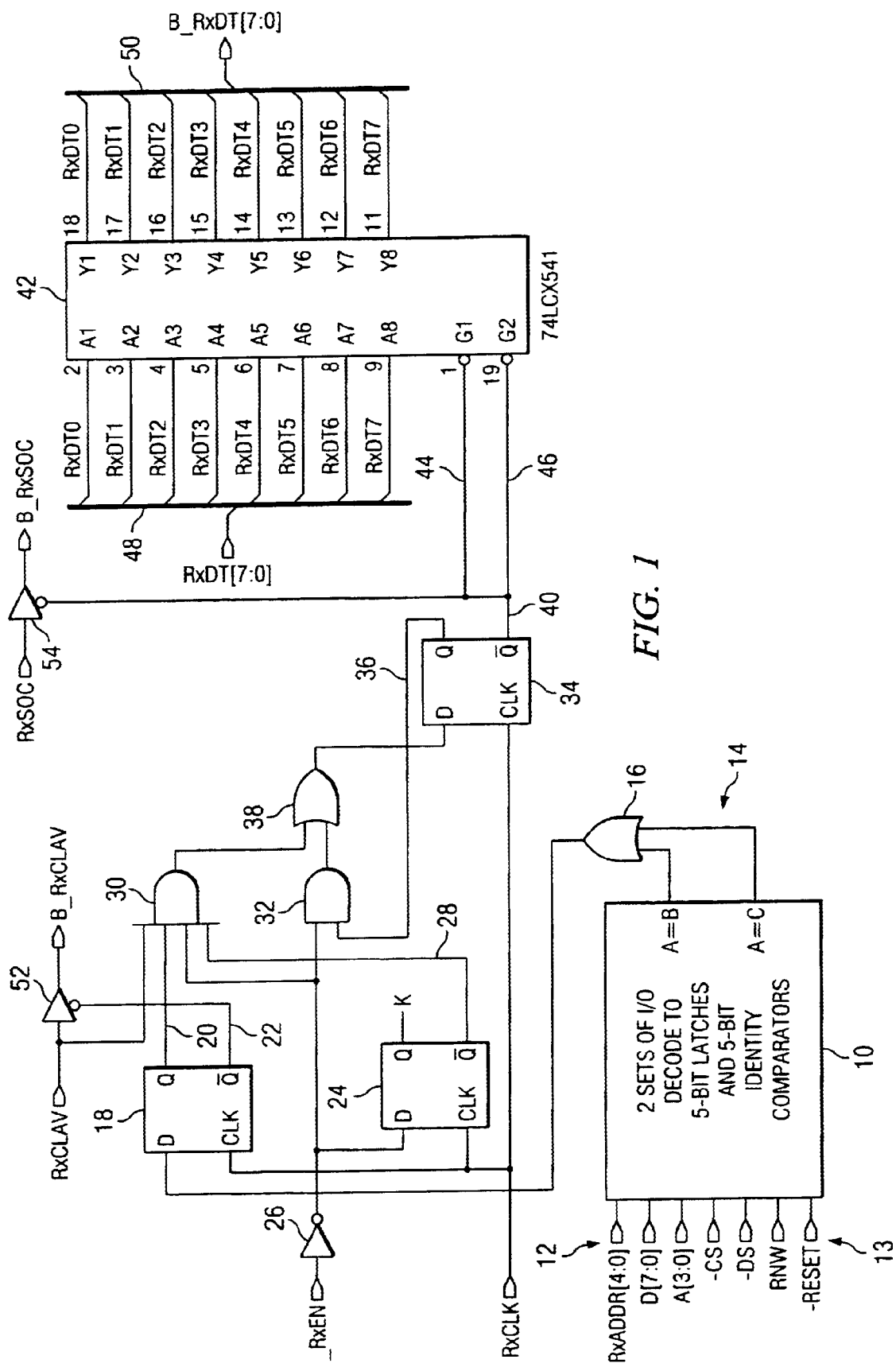
FIG. 1 is a logic diagram illustration of a data buffer and control system according to the present invention; and, FIG. 2 is a signal timing diagram illustrating UTOPIA 2 protocol.

This signal is termed an "active low", meaning that a high voltage level indicates de-assertion, and a low voltage level indicates assertion. In FIG. 1, this is indicated by the minus sign preceding the signal name.

RXADDR is an acronym for the address signals provided by the controller on a read address bus and identifies the peripheral from which the controller wants a receive cell available status indication, or from which the controller is ready to start receiving data bytes. There is also a TXADDR bus provided by the controller to identify a peripheral from which the controller wants a transmit cell available status indication, or to which the controller is ready to send data byte(s). Each of these addresses is five bits wide in the UTOPIA 2 protocol and provides for up to 31 peripheral devices, with one address reserved as a null address. The null address is applied to the address bus when the controller does not want to poll or select a peripheral device, such as between active poll clock cycles to prevent signal contention on the cell available line.

RXCLAV is an acronym for read cell available. When a peripheral device recognizes its address on the receive address bus, it provides either a high logic level on RXCLAV control bus line during the next clock cycle to indicate that it has a cell of data ready for driving onto the read bus for reading by the controller or it provides a low logic level indicating that it does not have data available.

TXCLAV is an acronym for transmit cell available. When a peripheral device recognizes its address on the transmit address bus, it provides either a high logic level on TXCLAV control bus line during the next clock cycle to indicate that it has room to accept a cell of data to be transmitted by the controller or it provides a low logic level indicating that it does not have room available.

RXSOC is an acronym for read or receive start of cell. It is provided by a peripheral and indicates that the current byte of data being driven onto the read data bus by a peripheral is the first byte in a data cell.

TXSOC is an acronym for transmit start of cell. It is provided by the controller and indicates that the current byte of data being driven onto the transmit data bus by the controller is the first byte in a data cell.

RXDT0 through RXDT7 represent the eight bits of a data byte provided by a peripheral for application to the read data bus.

BRXDT0 through BRXDT7 represent the bits of data RXDT0 through RXDT7 after they have been coupled from the inputs to the outputs of a buffer. In the present invention these buffered data signals are driven onto the backplane read data bus.

PHY is an abbreviation of "physical device" used in the UTOPIA 2 protocol to mean any peripheral device under control of an ATM layer.

ATM is an acronym for asynchronous transfer mode. It is also used to mean an ATM layer, or the controller in such layer, which controls the transfer of data to and from the various PHYs or peripheral devices under control of the ATM. The controller itself is usually a microprocessor and may be referred to as a CPU or central processing unit. The terms ATM, ATM controller and CPU are therefore often used somewhat interchangeably.

DESCRIPTION OF AN EMBODIMENT OF THE INVENTION

With reference to FIG. 1, there is provided a schematic diagram of an embodiment of the present invention using standard logic element representations. An address detection logic unit 10 contains 5-bit identity comparison logic devices, and has inputs 12 for receiving the receive address signals from the ATM layer which controls the overall system. Within unit 10 is one or more register(s) which store the UTOPIA 2 address(es) of selected peripheral device(s) residing on the same printed circuit board as the circuitry of the present invention. These registers are written by the central system controller in a very standard way using normal address (A), data (D), chip select (CS), data strobe (DS), and read/write direction (RNW) control lines 13. A reset input is also provided to set the registers to a known state. In the preferred embodiment, these registers are reset to the UTOPIA 2 'null address' number (all 'ones'). This value cannot be a valid PHY address, so logic in block 10 also internally disables the identity comparison output of any register with any such value. With this reset, it is ensured that the control logic is completely benign following a system reset operation. When the address on the address bus matches one or more of the stored addresses (and is, of course, not the 'null address'), unit 10 provides a signal on its outputs 14. Multiple output address match signals are combined through OR gate 16 (unnecessary, of course, for an implementation with a single match output) to the Data input of D-type flip flop (DFF) 18. The CLK, clock, input of DFF 18 (as well as the other DFF devices) is connected to the UTOPIA 2 receive clock signal, RXCLK. DFF 18 has a positive output 20 and a negative output 22. Output 22 directly controls the receive cell available buffer 52 to allow the PHY device RXCLAV indication to be buffered to the backplane for the clock cycle following any clock cycle in which an address match is determined. This control logic is necessary and sufficient for both the polling and PHY select protocol usages.

There may be two or more PHYs on the same printed circuit board on which the buffer circuitry of the present invention is carried. The outputs signals, e.g. RXCLAV, TXCLAV, RXSOC and RXD, of all of the PHYs on the board are connected together on a set of buses operating in UTOPIA 2 protocol. It is through these buses that the signals are coupled to the buffer circuitry of the present invention. The circuitry of FIG. 1 provides for recognizing two addresses, and is therefore intended for a board with up to two PHYs. If more than two PHYs are carried on the board, additional sets of memory latches and decoders may be added.

The control logic just described, i.e. address detection unit 10, gate 16 DFF 18, and buffer 52, must be fully duplicated for the transmit direction controls to allow buffering of the TXCLAV signal. For the transmit part of the system, the TXADDR signal from the ATM layer replaces the RXADDR signal, the TXCLAV signal from the PHY replaces the RXCLAV signal, and if there is a separate transmit clock signal, then the TXCLK from the ATM layer replaces the RXCLK signal. During the transmit cycle the only signal transmitted from the PHY to the ATM controller is the TXCLAV signal. So it is the only signal which must have a controlled buffer to avoid contention on the backplane. Other signals, such as TXSOC, are only received by the PHY, so that a buffer which remains active at all times may be used.

The rest of the logic of FIG. 1 is involved only with the PHY selection and further enabling process for data cell receive. A second DFF 24 has its D input coupled by inverter 26 from the active-low RXEN signal. DFF 24 has an unused positive output and a negative output 28.

A first AND gate 30 has four inputs connected to: the RXCLAV signal, output 20 of DFF 18, the RXEN signal from inverter 26 and output 28 of DFF 24. A second AND gate 32 has two inputs coupled to the RXEN signal from inverter 26 and to the positive output 36 of a third DFF 34. An OR gate 38 has two inputs connected the outputs of AND gates 30 and 32. The output of OR gate 38 is connected to the D input of DFF 34. The DFF 34 also has a clock input connected to the RXCLK clock signal and has positive output 36 and inverted output 40. An octal buffer 42 has both of its output enable inputs 44 and 46 connected to the inverted output 40 of DFF 34. Buffer 42 has eight data inputs 48, labeled RXDT0 through RXDT7, which are coupled to the data outputs of a peripheral device mounted on the same printed circuit board on which the circuitry shown in FIG. 1 is mounted. Buffer 42 has eight outputs 50, labeled BRXDT0 through BRXDT7, each coupled to a pin on the circuit board so that they may be connected through a backplane socket to the read data bus.

A tristatable buffer 52 has a signal input coupled to the RXCLAV output of the peripheral device and an output connected to the appropriate pin for connection to the backplane line designated BRXCLAV. The buffer 52 inverted output enable input is coupled to the DFF 18 inverted output 22.

A second tristatable buffer 54 has a signal input coupled to the RXSOC output of the peripheral device and an output connected to the appropriate pin for connection to the backplane line designated BRXSOC. The buffer 54 inverted output enable input is coupled to the DFF 34 inverted output 40.

Figure 2:
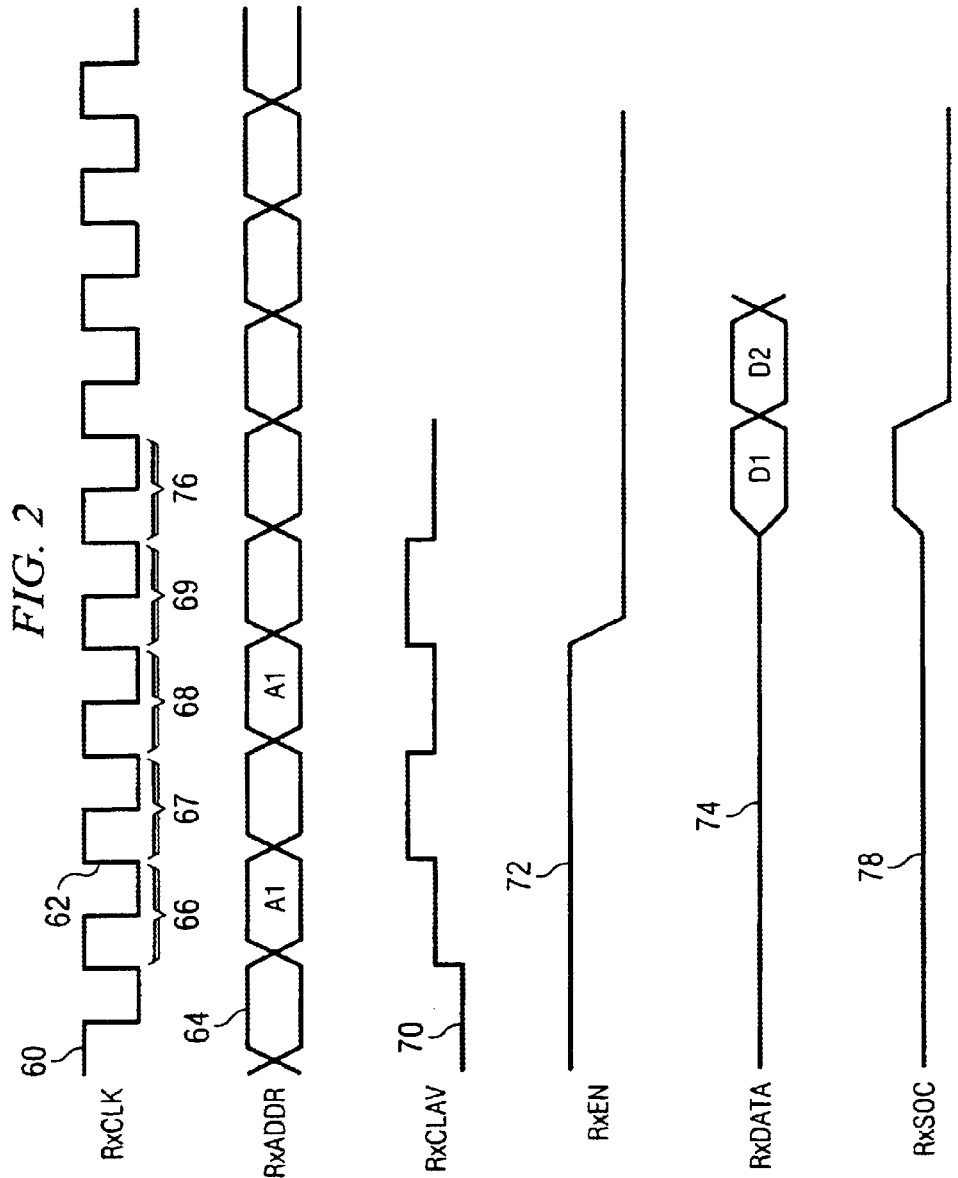

That part of the UTOPIA protocol relevant to the present invention will be further explained with reference to FIG. 2. The system clock signal, RXCLK, is illustrated as a square wave signal 60. Reading of signal inputs and changing of signal outputs all occur on positive going clock transitions such as transition 62.

The address signal RXADDR, is illustrated as signal 64. During each clock signal a five bit address is provided on the address bus by the CPU. During clock cycles 66 and 68, the address A1 is shown and for these purposes is the address of a peripheral device which has data outputs connected to the inputs 48 of buffer 42. Generally: the alternate clock cycles; such as cycle 67 have the null address.

The receive cell available signal, RXCLAV, is represented by the three level waveform 70. The lowest level indicated no data available, the highest level indicates data is available, and the middle level is the three state or high impedance condition. As illustrated, the UTOPIA protocol requires the peripheral to respond to its address with a cell availability status indication in the next clock cycle. In response to its address appearing in clock periods 66 and 68, the peripheral produces a high level RXCLAV signal in clock periods 67 and 69 indicating that data is available. The first indication is the 'poll' cycle, and the second is part of the PHY selection process.

The read enable signal, RXEN, is illustrated by the waveform 72. This signal is asserted at the low logic level and de-asserted at the high logic level. In this illustration, the CPU learned in clock cycle 67 that the peripheral had read data available. By addressing the peripheral again in period 68 and then changing the RXEN signal from de-asserted to asserted state in the following clock period 69, the UTOPIA protocol instructs the peripheral to start driving data bytes onto the read data bus on the next clock cycle.

The read data bus signals, RXDATA, are represented by the waveform 74. In this example the signal has no data until clock period 76, where data byte D1 appears. The UTOPIA protocol requires that successive data bytes, such as D2, of a cell follow sequentially so long as the RXEN signal is asserted.

The read data start of cell signal RXSOC is illustrated by waveform 78. It is in the three state or high impedance condition unless data is being driven onto the read data bus. In this example, byte D1 is the first data byte in a cell. Therefore in clock cycle 76, the RXSOC signal goes to a high level. Since the following data, such as byte D2 are not the start of the cell, the RXSOC goes to the low logic level until the cell is completed.

As noted above, the peripheral device has internal logic to read the UTOPIA signals and control its outputs to drive data only at the proper times and to place the data outputs in high impedance states at all other times. The logic circuitry of FIG. 1 provides these functions for the buffer 42. The address detector 10 has the address of device A1 stored in a five bit latch. When that address appears on the UTOPIA address bus, it provides a high logic level signal on its outputs 14. This causes gate 16 to provide a high logic level to the D input of DFF 18.

During clock cycle 66 the address of device A1 is detected. On the clock transition at the end of cycle 66, the DFF 18 switches its output 20 to high logic level and its output 22 to low logic level. The output 22 enables the buffer 52 so that on clock cycle 67, the PHY may send the RXCLAV signal to the ATM layer indicating that it has read data available. Clock cycles 66 and 67 complete a polling operation during which the ATM layer learned that device A1 is ready to provide data.

On clock cycle 68 the address of device A1 was again detected. On the clock transition at the end of cycle 68, the DFF 18 switches its output 20 to high logic level and its output 22 to low logic level. This again enables buffer 52 so that the RXCLAV signal may be sent to the ATM layer over the backplane. On the same transition at the end of cycle 68, the RXEN signal coupled to the D input of DFF 24 is positive and its output 28 goes to a high logic level. During clock cycle 69 the peripheral responds with a positive RXCLAV signal and the RXEN signal at the output of inverter 26 goes to positive logic level. When this happens, all four inputs to gate 30 are at high logic level, so that its output goes to high logic level. This high logic level causes the output of gate 38 to go to high logic level.

On the positive clock transition at the end of period 69, the DFF 34 will switch its output 36 to high logic level and its output 40 to low logic level. The output 40 is inverted at the inputs 44 and 46 of buffer 42 and enables the outputs of buffer 42. Data bytes D1, D2, etc. from the peripheral are therefore coupled through the buffer 42 to the UTOPIA read bus during the following clock cycles. On this same clock transition output 36 and the RXEN signals are both at high logic levels causing the output of gate 32 to go to high logic level. This maintains the state of DFF outputs 36 and 40 for so long as the RXEN signal is asserted. Buffer 42 remains enabled until the clock cycle after RXEN is de-asserted.

The buffer 52 is enabled by output 22 of DFF 18 at the clock transition at the end of clock cycle 68. This allows the RXCLAV signal from the peripheral to be driven onto the UTOPIA RXCLAV control bus. On the next clock cycle, the state of DFF 18 will change and the buffer 52 will be disabled.

Buffer 54 output enable input is driven by the DFF 34 output 40 and remains enabled until the RXEN signal is de-assented. This allows the RXSOC signal to remain active so long as data bytes are being driven onto the read data bus by the peripheral device.

As noted above, circuitry for buffering the TXCLAV signal from the PHY device is also provided. It functions in the same way as the corresponding parts of the read cycle circuitry. That is, when the PHY address is detected, it is stored by a DFF which drives the enable input of a single bit buffer. This allows the PHY to send its TXCLAV signal to the ATM layer in the clock cycle following each polling or selection cycle in which its address appears.

The system of the present invention provides output buffers for all of the signals which a peripheral device needs to drive to UTOPIA 2 buses. It controls the buffers in conformity with the UTOPIA 2 protocol. As a result, the advantages of the UTOPIA 2 protocol can be achieved in systems, such as telecommunications systems where signal buses are connected through a backplane and therefore require more powerful signal drivers than are provided by available peripheral devices. The present invention is also applicable to large single board systems where the buses are so large as to overload the normal peripheral output drivers.

While the present invention has been illustrated and described with reference to particular apparatus and methods of operation, it is apparent that various changes and substitution of equivalent parts may be made within the scope of the present invention as stated in the appended claims.

What is claimed is:

1. A system for transferring data from a peripheral device to a CPU in a telecommunications hub operating under UTOPIA protocol, comprising:

a data buffer having data inputs coupled to data outputs of the peripheral device, having data outputs connected to an UTOPIA read data bus and having a control input for receiving a output enable signal;

address detection logic comprising a register for storing the address of the peripheral device, an input for receiving a read address from an UTOPIA address bus, and an output for providing an indication of when the UTOPIA bus address matches the stored address;

a first DFF having a data input coupled to the address detection logic output, a clock input coupled to an UTOPIA bus clock line, and an output indicating the state of the address detection logic output during the preceding clock cycle;

a second DFF having a data input coupled to an UTOPIA bus receive enable line, a clock input coupled to the UTOPIA bus clock line, and an output indicating the state of the UTOPIA bus receive enable line during the preceding clock cycle; and a first AND gate, having inputs coupled to the outputs of the first DFF and second DFF, said inputs to a read cell available signal output of the peripheral device, said inputs and to an UTOPIA bus read enable line and having an output coupled to the data buffer control input.

2. The system of claim 1, further including:

a second buffer having an input coupled to the peripheral device read start of cell signal output, an output coupled to the UTOPIA bus read start of cell signal line, and having a control input coupled to the AND gate output.

3. The system of claim 1 further including:

a second AND gate having a first input coupled to the UTOPIA bus receive enable line, a second input, and an output;

an OR gate having inputs coupled to the outputs of the first and second AND gates, and having an output; and a third DFF having a data input coupled to the output of the OR gate, a clock input coupled to a clock line of the UTOPIA bus, and having a positive output coupled to the second input of the second AND gate and an output coupled to the data buffer control input.

4. The system of claim 3, further including:

a second buffer having an input coupled to the peripheral device read start of cell signal output, an output coupled to the UTOPIA bus read start of cell signal line, and having a control input coupled to the third DFF output.

5. A system for transferring a cell available status signal from a peripheral device to a CPU in telecommunications hub operating under UTOPIA protocol, comprising:

a buffer having an input coupled to a cell available output of a peripheral device, having an output connected to a UTOPIA cell available status bus, and having a control input for receiving a output enable signal;

address detection logic comprising a register for storing the address of the peripheral device, an input for receiving an address from the UTOPIA bus, and an output for providing an indication of when the UTOPIA bus address matches the stored address;

a DFF having a data input coupled to the address detection logic output, a clock input coupled to the UTOPIA bus clock line, and an output coupled to the data buffer control input; and wherein the cell available status signal is a read cell available status signal, the buffer output is coupled to the UTOPIA read cell available signal bus and, the address detection logic receives the read address signal from the 20 UTOPIA bus.

6. A system for transferring a cell available status signal from a peripheral device to a CPU in telecommunications hub operating under UTOPIA protocol, comprising:

to a buffer having an input coupled to a cell available output of a peripheral device, having an output connected to a UTOPIA Read data bus, and having a control input for receiving a output enable signal;

address detection logic comprising a register for storing the address of the peripheral device, an input for receiving an address from the UTOPIA bus, and an output for providing an indication of when the UTOPIA bus address matches the stored address;

a DFF having a data input coupled to the address detection logic output, a clock input coupled to the UTOPIA bus clock line, and an output coupled to the data buffer control input; and wherein the cell available status signal is a transmit cell available status signal, the buffer output is coupled to the UTOPIA transmit cell available signal bus and, the address detection logic receives the transmit address signal from the UTOPIA bus.

7. The system of claim 1, wherein the UTOPIA read data bus comprises a backplane.

* * * * *

UNITED STATES PATENT AND TRADEMARK OFFICE
CERTIFICATE OF CORRECTION

PATENT NO. : 6,850,535 B1
DATED : February 1, 2005
INVENTOR(S) : Goodrich, II et al.

It is certified that error appears in the above-identified patent and that said Letters Patent is hereby corrected as shown below:

Column 10,
Line 28, delete "to" before "a buffer"

Signed and Sealed this

Twenty-fourth Day of May, 2005

JON W. DUDAS
*Director of the United States Patent and Trademark Office*